United States Patent Office 3,251,857
Patented May 17, 1966

3,251,857
HETEROCYCLIC SPIRO CARBONATES
Fritz Hostettler and Eugene F. Cox, Charleston, W. Va., assignors to Union Carbide Corporation, a corporation of New York
No Drawing. Filed Sept. 26, 1963, Ser. No. 311,641
14 Claims. (Cl. 260—327)

This invention relates to the preparation of cyclic carbonate compounds. In various aspects, the invention relates to processes for producing said cyclic carbonate compounds.

The novel heterocyclic spiro carbonate compounds which are contemplated can be characterized by the following formula

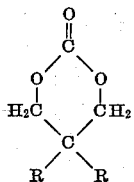

wherein both R's together with the gem carbon atom form the following heterocyclic nuclei:

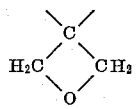 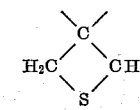 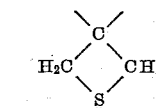
(1)　　　　　(2)　　　　　(3)

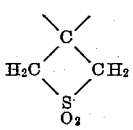 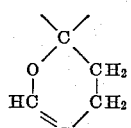 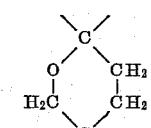
(4)　　　　　(5)　　　　　(6)

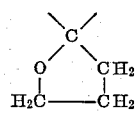 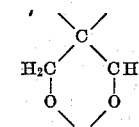 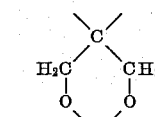
(7)　　　　　(8)　　　　　(9)

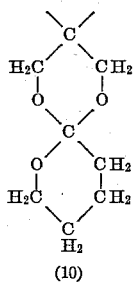 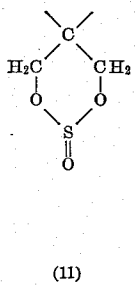
(10)　　　　　(11)

The $R_1$ radicals in the heterocyclic nuclei designated as (8) supra are explained at a more appropriate section hereinafter.

More specifically, the novel carbonate compounds encompassed within the scope of the invention include:

(1) 3-oxo-2,4,8-trioxaspiro[5.3]nonane

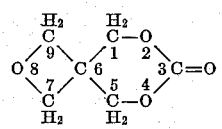

(2) 3-oxo-8-thia-2,4-dioxaspiro[5.3]nonane

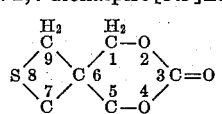

(3) 3-oxo-8-thia-2,4-dioxaspiro[5.3]nonane-8-oxide

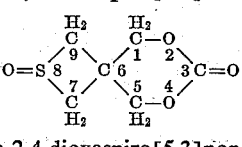

(4) 3-oxo-8-thia-2,4-dioxaspiro[5.3]nonane-8-dioxide

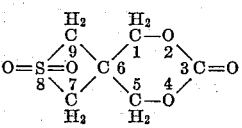

(5) 3-oxo-2,4,7-trioxaspiro[5.5]undec-8-ene

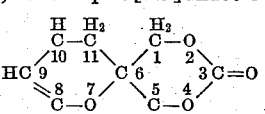

(6) 3-oxo-2,4,7-trioxaspiro[5.5]undecane

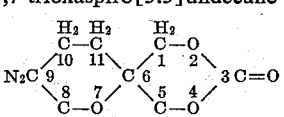

(7) 3-oxo-2,4,7-trioxaspiro[5.4]decane

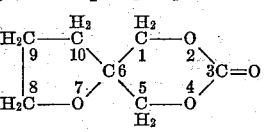

(8) 3-oxo-2,4,8,10-tetraoxaspiro[5.5]undecanes

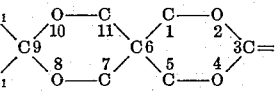

Each $R_1$, individually, being hydrogen or a monovalent hydrocarbon radical, i.e., a hydrocarbyl radical, such as alkyl, aryl, cycloalkyl, aralkyl, alkaryl, alkenyl, cycloalkenyl, and the like. It is preferred that each $R_1$ contain less than 8 carbon atoms. Illustrative $R_1$ radicals include, for example, the alkyls, e.g., methyl, ethyl, n-propyl, isopropyl, n-butyl, sec-butyl, t-butyl, isobutyl, n-hexyl, 2-ethylhexyl, dodecyl, octadecyl, and the like; the cycloalkyls, especially those which contain from 5 to 7 carbon atoms in the cycloaliphatic nucleus, e.g., cyclopentyl, cyclohexyl, cycloheptyl, alkylcyclopentyl, alkylcyclohexyl, alkylcycloheptyl, and the like; the aryls, e.g., phenyl, naphthyl, anthryl, biphenylyl, and the like; the aralkyls, e.g., benzyl, phenethyl, phenylbutyl, and the like; the alkaryls, e.g., tolyl, xylyl, ethylphenyl, octylphenyl, and the like; the alkenyls, e.g., vinyl, allyl, crotyl, 3-butenyl, 2-methylpropenyl, 2-ethylhexenyl, and the like; the cycloalkenyls, especially those which contain from 5 to 6 carbon atoms in the cycloaliphatic nucleus, e.g., cyclopentenyl, cyclohexenyl, lower alkyl substituted cyclohexenyl, and the like.

(9) 3-oxo-2,4,8,10-tetraoxaspiro[5.5]undecane-9-[2'-(oxacyclohex-5'-ene)]

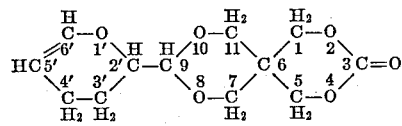

(10) 3-oxo-2,4,8,10-tetraoxaspiro[5.5]undecane-9-(2'-tetrahydropyran)

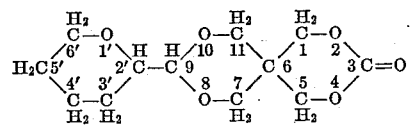

(11) 3-oxo-2,4,8,10-tetraoxa-9-thiaspiro[5.5]undecane-9-oxide

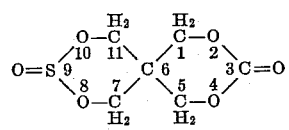

The preparation of 3-oxo-2,4,8-trioxaspiro[5.3]nonane (designated as (1) supra) is effected by the following sequence of steps:

I
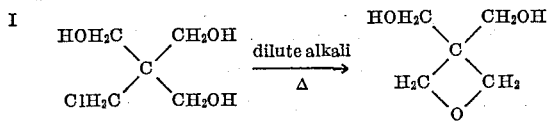

pentaerythritol monochloride.

The resulting 2,3-dimethyloloxetane produce then can be reacted with phosgene, preferably in the presence of, for example, an alkali metal hydroxide, alkaline earth metal hydroxide, or a tertiary amine such as triethylamine, pyridine, etc., at a temperature of from about 0° C. to about 50° C., and higher, to produce the carbonate compound illustrated above. Alternatively, the product of Equation I can be reacted with the dialkyl carbonates

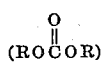

e.g., diethyl carbonate, etc., or the alkylene carbonates, e.g., ethylene carbonate, propylene carbonate, etc., in the presence of a transesterification catalyst such as alkali metal alkoxides, alkaline earth metal alkoxides, e.g., the methoxides, ethoxides, etc., of the Group I and II metals, the titanates having the general formulae $Y_2TiO_4$ and $Y_4TiO_4$ in which the Y's are alkyl, aryl, or aralkyl radicals. The tin compounds, the organic salts of lead, and the organic salts of manganese which are described in U.S. 2,890,208 as well as the metal chelates and metal acylates disclosed in U.S. 2,878,236 can be employed as exemplified transesterification catalysts. The disclosures of the aforesaid patents are incorporated by reference into this specification. Equation II infra illustrates the cyclization step whereby the novel carbote compounds is formed.

II
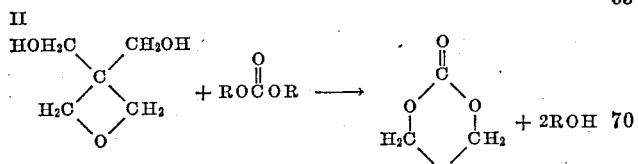

The preparation of 3-oxo-8-thia-2,4-dioxaspiro[5.3]nonane is accomplished as follows:

III
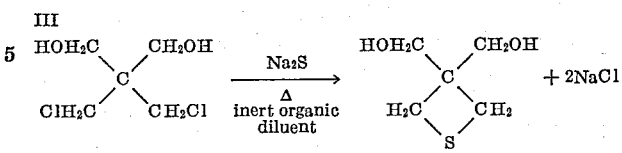

pentaerythritol dichloride.

The resulting 3,3-dimethylolthietane product then can be subjected to the cyclization step illustrated in Equation II supra to obtain the novel carbonate compound designated as (2) supra.

The sulfinyl compound of (3) supra as well as the sulfonyl compound of (4) supra can be prepared by contacting 3,3-dimethylolthietane with peracetic acid contained in an inert normally liquid organic vehicle, e.g., ethyl acetate, at a temperature of from about 0° C. to about 75° C. The following Equation IV is illustrative:

IV
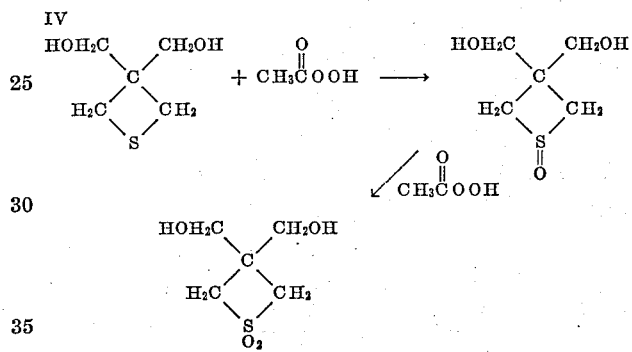

The cyclization step noted in Equation II supra produces the appropriate novel carbonate compound.

The preparation of 3-oxo-2,4,7-trioxaspiro[5.5]undec-8-ene compound and the 3-oxo-2,4,7-trioxaspiro[5.5]undecane compound depicted in Formulae 5 and 6 supra is accomplished by an aldol condensation of the appropriate aldehyde which contains one alpha hydrogen atom, with formaldehyde, followed by a Cannizzaro reaction with additional formaldehyde. Equation V depicts the overall reaction:

V
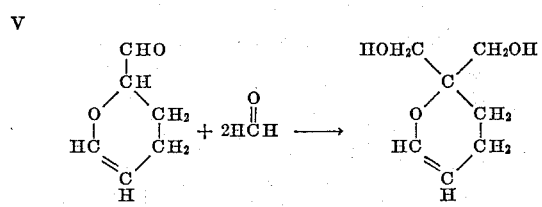

acrolein dimer.

The cyclization step set out in Equation II supra will produce 3-oxo-2,4,7-trioxaspiro[5.5]undec-8-ene. Hydrogenation of the 4,4-dimethylol-3-oxacyclohexene product of Equation V in the presence of convention hydrogenation catalysts, e.g., Raney nickel, platinum, etc., at an elevated temperature, e.g., from about 50° C. to about 200° C., followed by the cyclization reaction of Equation II produces 3-oxo-2,4,7-trioxaspiro[5.5]undecane.

The novel compound noted in Formula 7 supra is produced as follows:

VI
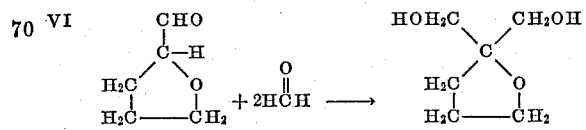

tetrahydrofurfural.

The cyclization of the resulting 2,2-dimethyloloxacyclopentane product as described in Equation II supra yields 3-oxo-2,4,7-trioxaspiro[5.4]decane.

The 3 - oxo - 2,4,8,10 - tetraoxaspiro[5.5]undecanes of Formula 8 above are prepared by reacting a monocarbonyl compound, e.g., formaldehyde, alkanal, alkenal, cycloalkanecarboxaldehyde, the aromatic carboxaldehydes, dialkyl ketone, alkenyl aryl ketone, alkyl aryl ketone, etc.; with pentaerythritol; in the presence of a mineral acid or sulfonic acid catalyst, e.g., sulfuric acid, ethanesulfonic acid, benzenesulfonic acid, and the like; at an elevated temperature, e.g., from about 50° C. to about 150° C.; followed by cyclizing the resulting 5,5-dimethylol-1,3-dioxacyclohexane product as described in Equation II previously. Equation VII below sets out the sequence of steps that are involved:

VII

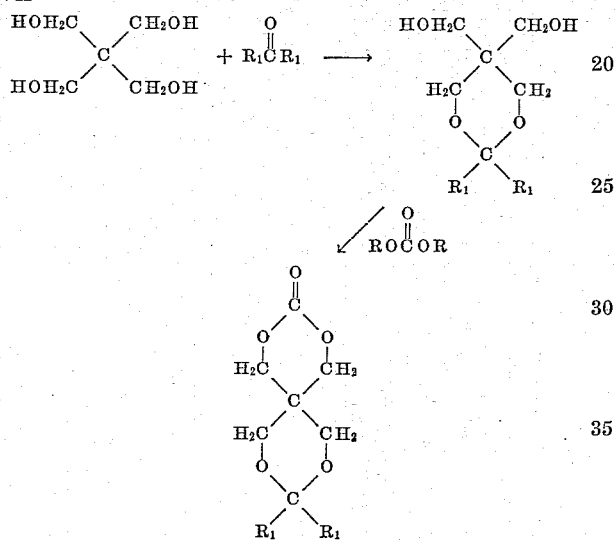

Each $R_1$ of

represents hydrogen or a monovalent hydrocarbon radical.

The compound depicted in Formula 9 above is prepared as indicated in Equation VII with the exception that

represents the acrolein dimer.

VIII

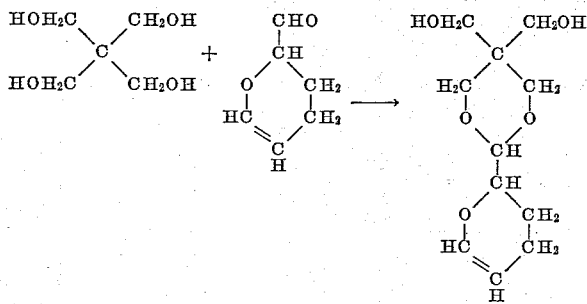

The cyclization of the above product readily produces the corresponding novel carbonate compound. Hydrogenation of the double bond of the product shown in Equation VIII, followed by the cyclization of the hydrogenated compound produces the novel carbonate designated by Formula 10 supra.

The reaction of pentaerythritol with sulfonyl chloride at a moderately elevated temperature, e.g., about 50° C. to about 75° C., yields 2-oxo-5,5-dimethylol-1,3-dioxa-2-thiacyclohexane which in turn can be cyclized to the novel carbonate compound shown structural in Formula 11 supra.

IX

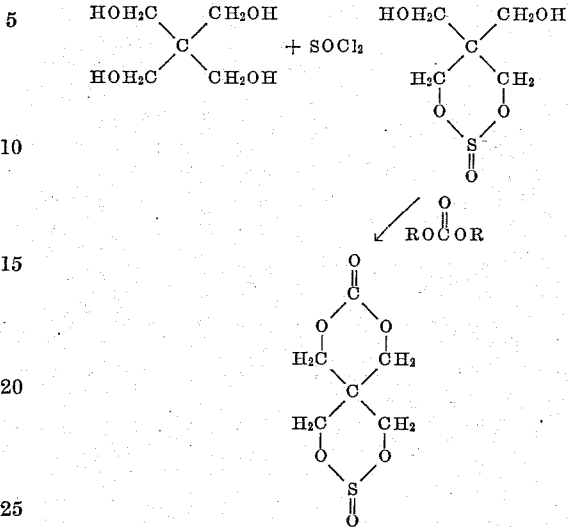

The novel saturated as well as the ethylenically unsaturated cyclic carbonates can be homopolymerized or copolymerized through the carbonate group, in the presence of catalysts such as n-butyllithium, di-n-butylzinc, and triisobutylaluminum, at a temperature of from about 0° to about 200° C., and for a period of time sufficient to produce high molecular weight solid products. The solid products can be used in the moldings and laminating arts, for the manufacture of toys, paper weights, skis, and the like. The solid products which contain a plurality of pendant groups having ethylenic sites can be cured via procedures well recognized in the synthetic and natural rubber arts, e.g., sulfur cure, to give hard, solid products. These products have utility as synthetic ebonites. In addition, they are also useful in the aforesaid plastics applications.

The novel cyclic carbonate compounds which contain ethylenic unsaturation can be contacted with an organic peracid to produce the corresponding vicinal-epoxide. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert oganic vehicle is suitable; from about 20 to 40 weight percent of the peracid, is preferred. The epoxidation reaction can be conducted at a temperature in the range of from about 0° C., and lower, to about 100° C., and higher, and preferably from about 20° C. to about 80° C. Substantial conversion of the novel monoethylenically unsaturated cyclic carbonate compounds to the corresponding vicinal-epoxy cyclic carbonate compounds is favored or accomplished by employing at least one mol of peracid per mol of said monoethylenically unsaturated cyclic carbonate, e.g., from about 1.0 to about 10 mols of peracid per mol of said carbonate. In general, the epoxidation reaction is conducted for a period of time which is sufficient to introduce oxirane oxygen at the ethylenic site of the carbonate reactant. Oftentimes, this reaction period is usually sufficient to essentially consume the quantity of peracid employed. Periodic analysis of samples of the reaction mixture to determine the quantity of peracid consumed during the epoxidation reaction can be readily performed by the operator by well-known techniques. At the termination of the epoxidation reaction, the unreacted ethylenically unsaturated carbonate precursor, acid by-product, inert vehicle, if employed, and the like, can be recovered from the reaction product mixture, for example, by distillation under reduced pressure. Further well-known procedures such as fractional distillation, and the like, can be used to purify the vicinal-epoxy cyclic carbonate product.

The vicinal-epoxy cyclic carbonate compounds are novel and useful. They can be homopolymerized or copolymerized with other vicinal-epoxy cyclic carbonates or with other mono- or polyepoxides, preferably in the presence of an epoxy polymerization catalyst such as the metal halide Lewis acids, e.g., boron trifluoride, under typical epoxy polymerization conditions, to give solid polymeric products which are useful as paperweights, in the manufacture of toys, etc.

Among the mono- and polyepoxides which are contemplated include, among others, 4-vinylcyclohexene dioxide, dicyclopentadiene dioxide, divinylbenzene dioxide, 3,4-epoxy - 6 - methylcyclohexylmethyl 3,4 - epoxy - 6-methyl-cyclohexanecarboxylate, diethylene glycol bis(3,4-epoxycyclohexanecarboxylate), bis(2,3-epoxycyclopentyl) ether, butadiene dioxide, phenyl glycidyl ether, 1,2-epoxydodecane, and the like.

In addition, the novel vicinal-epoxy cyclic carbonates with or without a polyepoxide such as those illustrated previously, can be reacted with an active organic hardener such as polycarboxylic acids, polycarboxylic acid anhydrides, polyfunctional amines, polyols, polythiols, polyisocyanates, polyacyl halides, and the like, preferably in the presence of a typical epoxy polymerization catalyst, BF$_3$-etherate, under conventional curing conditions, to produce solid epoxy resins which are useful in the laminating, coating, molding, and encapsulating arts.

The following examples are illustrative.

*Example 1*

A. To a 4-neck flask equipped with air stirrer, thermometer, and distillation column, there are charged 272 grams of pentaerythritol, 295 grams of diethyl carbonate, and 0.5 gram of sodium. The resulting admixture is heated to about 100° C., and over a period of about 2 hours, the ethanol co-product is removed as it is formed via distillation. The reaction product mixture then is heated to about 180°–200° C. under a reduced pressure, e.g., about 0.5 mm. of Hg. The evolution of carbon dioxide is noted; 3,3-dimethyloloxetane distills at 128° C. at 0.03 mm. of Hg. Further purification by dissolution in chloroform followed by precipitation in petroleum ether gives a solid product identified as 3,3-dimethyloloxetane.

B. To a 4-neck flask equipped with air stirrer, thermometer, and distillation column, there are charged 18 grams of 3,3-dimethyloloxetane, 20 grams of diethyl carbonate, 0.2 gram of sodium, and 500 milliliters of toluene. The resulting admixture is heated to about 100° C., and over a period of about 2 hours, the ethanol co-product is removed as it is formed via distillation. The bulk of the toluene is then distilled under reduced pressure. Further reduction in the pressure, e.g., to about 1–2 mm. of Hg, essentially removes the remaining volatiles. The resulting residue then is dissolved in chloroform. The addition of petroleum ether thereto results in the crystallization of a product which is identified as 3-oxo-2,4,8-trioxaspiro[5.3]nonane by inspection of its infrared absorption spectrum and analysis for the carbonate group.

*Example 2*

A. To a reaction vessel, there are charged one mol of pentaerythritol dichloride and one mol of sodium sulfide in methanol. The resulting admixture is heated to about 90° C. for a period of 2 hours. Thereafter, the sodium chloride by-product is filtered from the reaction product mixture. Distillation of said product mixture yields 3,3-dimethylolthietane; melting point 72° C.

B. To a 4-neck flask equipped with air stirrer, thermometer, and distillation column, there are charged 67 grams of 3,3-dimethylolthietane, 70 grams of diethyl carbonate, 0.5 gram of sodium, and 2,000 milliliters of toluene. The resulting admixture is heated to about 100° C., and over a period of about 2 hours, the ethanol co-product is removed as it is formed via distillation. The bulk of the toluene is then distilled under reduced pressure. Further reduction in the pressure, e.g., to about 1–2 mm. of Hg, essentially removes the remaining volatiles. The resulting residue then is dissolved in chloroform. The addition of petroleum ether thereto results in the crystallization of a product which is identified as 3-oxo-8-thia-2,4-dioxaspiro[5.3]nonane by inspection of its infrared absorption spectrum and by analysis for the carbonate group.

*Example 3*

A. To a reaction vessel there are charged 1.5 mols of 3,3-dimethylolthietane and 1.0 mol of peracetic acid (contained as a 25 weight per cent solution in ethyl acetate). The resulting admixture is heated to about 40° C. for a period of 3 hours. Distillation of the resulting reaction product mixture plus further purification treatment yields a solid product identified as 1-oxo-3,3-methylolthietane.

B. To a 4-neck flask equipped with air stirrer, thermometer, and distillation column, there are charged one mol of 1-oxo-3,3-dimethylolthietane, 1.1 mols of diethyl carbonate, 2,000 milliliters of toluene, and 1.0 gram of sodium. The resulting admixture is heated to about 100° C., and over a period of about 2 hours, the ethanol co-product is removed as it is formed via distillation. The bulk of the toluene is then distilled under reduced pressure. Further reduction in the pressure, e.g., to about 1–2 mm. of Hg, essentially removes the remaining volatiles. The resulting residue then is dissolved in chloroform. The addition of petroleum ether thereto results in the crystallization of a product which is identified as 3-oxo-8-thia-2,4-dioxaspiro[5.3]nonane-8-oxide by inspection of its infrared absorption spectrum and by analysis for the carbonate group.

*Example 4*

A. In a manner analogous to Example 3A supra, the reaction of 3 mols of peracetic acid with one mol of 3,3-dimethylolthietane gives a solid product which is identified as 1,1-dioxo-3,3-dimethylolthietane.

B. In a manner analogous to Example 3B supra, the reaction of 1,1-dioxo-3,3-dimethylolthietane and diethyl carbonate yields a solid product which is identified as 3-oxo-8-thia-2,4-dioxaspiro[5.3]nonane-8-dioxide by inspection of its infrared absorption spectrum and by analysis for the carbonate group.

*Example 5*

A. To a 3-neck flask equipped with dropping funnel, motor stirrer, and reflux condenser, there are charged one mol of acrolein dimer, 100 cc. of methyl alcohol, 2.2 mols of formaldehyde (as 37.5% formalin). The resulting admixture is heated to 70° C. and maintained thereat while a solution of 40 grams of potassium hydroxide in 50 cc. of water is added. The mixture is heated for 60 minutes at 80° C., then refluxed for two hours. The reaction mixture is cooled, diluted with an equal volume of water, and extracted with ether. From the ether layer, there is obtained a solid product identified as 4,4-dimethylol-3-oxacyclohexene.

B. To a 4-neck flask equipped with air stirrer, thermometer, and distillation column, there are charged one mol of 4,4-dimethylol-3-oxacyclohexene, 1.2 mols of diethyl carbonate, 2,000 milliliters of toluene, and 1.0 gram of sodium. The resulting admixture is heated to about 100° C., and over a period of about 3 hours, the ethanol co-product is removed as it is formed via distillation. The bulk of the toluene is then distilled under reduced pressure. Further reduction in the pressure, e.g., to about 1-2 mm. of Hg, essentially removes the remaining volatiles. The resulting residue then is dissolved in chloroform. The addition of petroleum ether thereto results in the crystallization of a product which is identified as 3-oxo-2,4,7-trioxaspiro[5.5]undec-8-ene by inspection of its infrared absorption spectrum and by analysis for the carbonate group.

Example 6

A. Hydrogenation of 4,4-dimethylol-3-oxacyclohexene in butanol using a platinum catalyst and hydrogen, at an elevated temperature, e.g., about 100° C., gives 4,4-dimethylol-3-oxacyclohexane.

B. By following the procedure outlined in Example 5B supra using, however, 4,4-dimethylol-3-oxacyclohexane, there is obtained a solid product which is identified as 3-oxo-2,4,7-trioxaspiro[5.5]undecane by inspection of its infrared absorption spectrum and by analysis for the carbonate group.

Example 7

A. To a 3-neck flask equipped with dropping funnel, motor stirrer, and reflux-condenser, there are charged 16 grams of tetrahydrofurfural, 20 cc. of methyl alcohol, and 20 cc. of formalin. The resulting admixture is heated to 70° C. and maintained thereat while a solution of 17 grams of potassium hydroxide in 12 cc. of water was added. The mixture is heated for 60 minutes at 90° C., then refluxed for one hour. The reaction mixture is cooled, diluted with an equal volume of water, and extracted with ether. From the ether layer, there is obtained a solid product identified as 2,2-dimethyloloxacyclopentane.

B. To a 4-neck flask equipped with air stirrer, thermometer, and distillation column, there are charged one mol of 2,2-dimethyloloxacyclopentane, 1.1 mols of diethyl carbonate, 2,000 milliliters of toluene, and 1.0 gram of sodium. The resulting admixture is heated to about 100° C., and over a period of about 2 hours, the ethanol co-product is removed as it is formed via distillation. The bulk of the toluene is then distilled under reduced pressure. Further reduction in the pressure, e.g., to about 1-2 mm. of Hg, essentially removes the remaining volatiles. The resulting residue then is dissolved in chloroform. The addition of petroleum ether thereto results in the crystallization of a product which is identified as 3-oxo-2,4,7-trioxaspiro[5.4]decane by inspection of its infrared absorption spectrum and by analysis for the carbonate group.

Example 8

A. To a reaction vessel there are charged 58 grams of acetone, 136 grams of pentaerythritol, and 1 gram of p-toluenesulfonic acid. The resulting admixture is refluxed until the acetone is completely reacted. Distillation of the resulting reaction product mixture followed by further purification of the distillate gives a solid product identified as 2,2-dimethyl-5,5-dimethylol-1,3-dioxacyclohexane.

B. To a 4-neck flask equipped with air stirrer, thermometer, and distillation column, there are charged one mol of 2,2-dimethyl-5,5-dimethylol-1,3-dioxacyclohexane, 1.1 mols of diethyl carbonate, 2500 milliliters of toluene, and 1.0 gram of sodium. The resulting admixture is heated to about 100° C., and over a period of about 2 hours, the ethanol co-product is removed as it is formed via distillation. The bulk of the toluene is then distilled under reduced pressure. Further reduction in the pressure, e.g., to about 1-2 mm. of Hg, essentially removes the remaining volatiles. The resulting residue then is dissolved in chloroform. The addition of petroleum ether thereto results in the crystallization of a product which is identified as 9,9-dimethyl-3-oxo-2,4,8,10-tetraoxaspiro [5.5]undecane by inspection of its infrared absorption spectrum and by analysis for the carbonate group.

Example 9

A. In an analogous manner as Example 8A supra, the use of acrolein in lieu of acetone gives 2-vinyl-5,5-dimethylol-1,3-dioxacyclohexane.

B. In an analogous manner as Example 8B supra, the reaction of 2-vinyl-5,5-dimethylol-1,3-dioxacyclohexane with diethyl carbonate in toluene gives a solid product which is identified as 9-vinyl-3-oxo-2,4,8,10-tetraoxaspiro [5.5]undecane by its infrared absorption spectrum and by analysis for the carbonate group.

Example 10

A. The reaction of one mol of pentaerythritol with one mol of sulfonyl chloride (and two mols of pyridine) at about 50° C. for 2 hours gives a reaction product mixture which contains 2-oxo-5,5-dimethylol-1,3-dioxa-2-thiacyclohexane.

B. Phosgene (0.5 mol) is introduced into a stirred solution of 46 grams of 2-oxo-5,5-dimethylol-1,3-dioxa-2-thiacyclohexane, 60 grams of pyridine, and 1000 milliliters of toluene. The resulting solid by-product is removed via filtration, followed by distillation under reduced pressure to remove the bulk of the toluene from the filtrate. Further reduction in the pressure, e.g., to about 1-2 mm. of Hg, essentially removes the remaining volatiles. The resulting residue then is dissolved in chloroform. The addition of petroleum ether thereto results in the crystallization of a product which is identified as 3-oxo-2,4,8,10-tetraoxa-9-thiaspiro[5.5]undecane-9-oxide by inspection of its infrared absorption spectrum and by analysis for the carbonate group.

Example 11

A. In an analogous manner as Example 8A supra, the use of acrolein dimer in lieu of acetone gives 2-(2'-oxacyclohex-5'-enyl)-5,5-dimethylol-1,3-dioxacyclohexane. The reaction of this product with diethyl carbonate and sodium, as explained in Example 8B supra, results in a solid product which is indentified as 3-oxo-2,4,8,10-tetraoxaspiro[5.5]undecane - 9 - [2' - (2' - oxacyclohex-5'-ene)] by inspection of its infrared absorption spectrum and by analysis for the carbonate group.

What is claimed is:

1. A compound of the formula

wherein both R's together with the gem carbon atom form a heterocyclic nuclei of the group consisting of

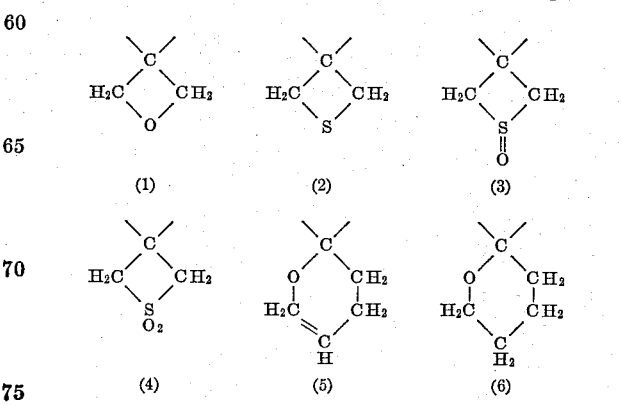

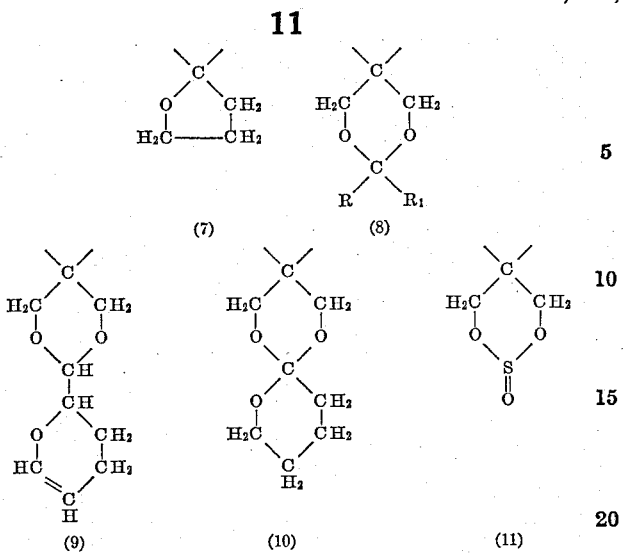

wherein each R' individually, of the heterocyclic nuclei designated as (8) above is of the group consisting of hydrogen and a monovalent hydrocarbon radical.

2. 3-oxo-2,4,8-trioxaspiro[5.3]nonane.
3. 3-oxo-8-thia-2,4-dioxaspiro[5.3]nonane.
4. 3-oxo-8-thia-2,4-dioxaspiro[5.3]nonane-8-oxide.
5. 3-oxo-8-thia-2,4-dioxaspiro[5.3]nonane-8-dioxide.
6. 3-oxo-2,4,7-trioxaspiro[5.5]undec-8-ene.
7. 3-oxo-2,4,7-trioxaspiro[5.5]undecane.
8. 3-oxo-2,4,7-trioxaspiro[5.4]decane.
9. 3-oxo-2,4,8,10-tetraoxaspiro[5.5]undecane.
10. 3-oxo-9-alkyl-2,4,8,10-tetraoxaspiro[5.5]undecane.
11. 3-oxo-9,9-dialkyl-2,4,8,10-tetraoxaspiro[5.5]undecane.
12. 3-oxo-2,4,8,10-tetraoxa-9-thiaspiro[5.5]undecane-9-oxide.
13. 3-oxo-2,4,8,10-tetraoxaspiro[5.5]undecane-9-[2'-(oxacyclohex-5'-ene)].
14. 3-oxo-2,4,8,10-tetraoxaspiro[5.5]undecane-9-(2'-tetrahydropyran).

No references cited.

WALTER A. MODANCE, *Primary Examiner.*
JAMES A. PATTEN, *Examiner.*